Nov. 21, 1950 — W. T. CIRONE — 2,530,758
IDENTIFICATION AND FINGERPRINT CAMERA
Filed Jan. 24, 1949 — 3 Sheets-Sheet 1

INVENTOR.
William T. Cirone
BY Clarence A. O'Brien
and Harvey B. Jacobson
Attorneys Nov. 21, 1950 W. T. CIRONE 2,530,758
IDENTIFICATION AND FINGERPRINT CAMERA
Filed Jan. 24, 1949 3 Sheets-Sheet 2

INVENTOR.
William T. Cirone
BY
Attorneys

Nov. 21, 1950 W. T. CIRONE 2,530,758
IDENTIFICATION AND FINGERPRINT CAMERA
Filed Jan. 24, 1949 3 Sheets-Sheet 3

INVENTOR.
William T. Cirone

Patented Nov. 21, 1950

2,530,758

UNITED STATES PATENT OFFICE 2,530,758

IDENTIFICATION AND FINGERPRINT CAMERA

William T. Cirone, Yuma, Ariz., assignor of seventy-five per cent to Photocheck Company, Yuma, Ariz.

Application January 24, 1949, Serial No. 72,368

14 Claims. (Cl. 95—11)

This invention relates to improvements in photographic apparatus of the dual type and has for its primary object to simultaneously record data along with the picture and fingerprints of an individual on a single photo-sensitized surface.

Thus the primary aim and purpose of this invention is to provide a device by which the image of a person may be reproduced and the fingers of the person may be reproduced to make the fingerprints of record, along with a copy of a data sheet containing information concerning the person or any other type of written matter on a single strip of photo-sensitized material without resetting or focusing the camera for each of the subjects.

Another object of this invention is to construct a camera which will simultaneously record or enable simultaneous photographs to be taken through different lens structures, the action of each lens being unobstructed by the other and both lens being used to photograph directly on the film.

A meritorious feature of this invention resides in the provision of a camera box having a pair of lenses, one of which is focused on a part of the film to impose on the adjacent portion of the sensitized film a photographic imprint of a person's face, the other lens being focused on an adjacent portion of the film for imposing on the film a photographic imprint of objects inserted into the box, namely, written matter and the fingers of the person, the images being imposed on the film by simultaneous action of both lenses on different parts of the film.

Another meritorious feature of this invention resides in the provision of a plurality of finger slots adapted to receive the fingers of an individual, switches being disposed in each of the slots and actuated by the fingertips of the individual when the fingers are entirely placed within the slots, the switches completing an operating circuit for the shutters for the camera so that the camera will not operate until all of the finger switches are closed.

These and ancillary objects and other structural features of merit are attained by this invention, a preferred embodiment of which is set forth in the following description and illustrated in the accompanying drawings, wherein.

Figure 1:
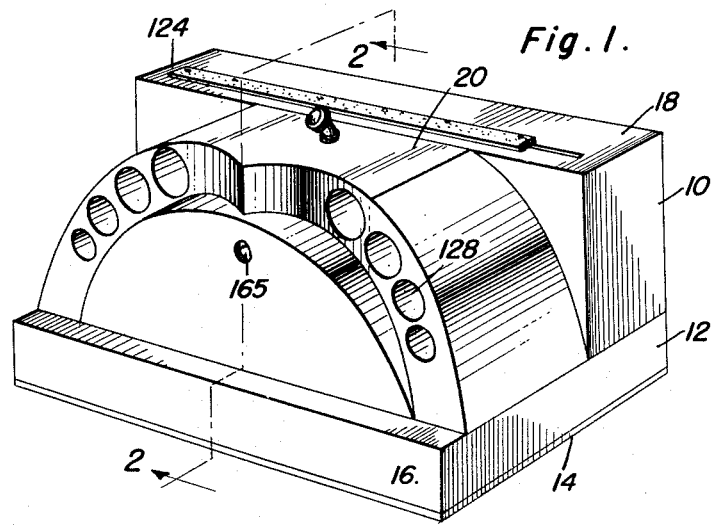
Figure 1 is a view in perspective of a camera constructed in accordance with the principles of the instant invention.
Figure 6:
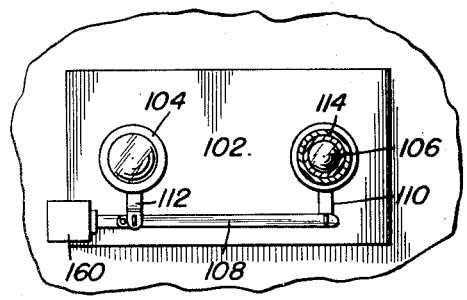
Figure 6 is an enlarged detail view of the dual lenses, shown generally in Figures 2 and 3.

In many instances, it is desirable to have a single permanent record of an individual together with written matter. Thus, an individual can be positively identified by having his fingerprints and facial characteristics and certain legal documents recorded on a single strip of film or on a single photo-sensitized surface.

One of the uses of the instant invention is to record bank transactions so that the camera would be positioned on the shelf of a teller's cage and a customer of the bank having a check cashed would drop the check into a slot formed in the casing and would position his fingers in the finger slots in the casing. The customer would be standing directly in front of the casing and the teller would then throw a master switch, whereupon, the finger switches being closed by contact with the fingertips, a light bulb would be illuminated in the casing and the dual lenses would impose the image of the individual's face, the fingertips and the check on adjacent sections of the single photo-sensitized surface. It can be appreciated that such a picture would enable the bank to have the facial impression, fingerprints and photograph of the check, constituting the transaction for reference in case of default or in the event of other reference purposes.

The primary aim and purpose of this invention is to discourage forgery and a passing of bogus checks and also, to reduce the amount of space needed for storing reference matter. In the latter respect, banks conventionally photograph checks during bookkeeping operations and also maintain a file for reference in case of defaults. However, with a camera constructed in accordance with this invention more information of a more positive nature or positive identifying nature would be available and could be filed in a more convenient manner and would require less space than that employed at the present.

As illustrated in the accompanying drawings, the camera 10 includes a base 12 having a bottom wall 14 and opposed side and end walls 16. An upright rectangular back section 18 is formed integrally with the base along with a front arcuately shaped section 20.

A pair of upright spindles 22 and 24 are mounted in diagonally opposed corners of the bottom wall to rotatably support a pair of reels or spools 26 and 28. A standard 16 mm. film 30 is carried by the reel 26 and wound onto the reel 28, after being exposed, by means of a motor 30. A pulley 32 is fixed on the armature shaft of the motor and is drivingly connected with the reel 28 by means of a pulley 34 associated with the reel and a cross connecting belt 36. The film is carried through a camera mechanism 38, to be later described. At the opposing ends of the camera mechanism are mounted brackets 40 and 42 having raised unattached ends 44 and 46 to which are vertically journaled guide rollers 48, the film being trained around the guide rollers, which enable the film to be advanced through the camera mechanism in a straight line to avoid ripping of the film or jamming of the mechanism.

Means is provided for moving the film through the camera mechanism, one sensitized section at a time and includes a pair of opposed guide rails 50 and 52 mounted in parallelism on the bottom wall adjacent the camera mechanism. A rack bar 54 is slidably and freely disposed between the guide bars or tracks and is anchored at one end by means of a spring 56. A drive shaft 58 is associated with the motor 30 and a gear 60 is threaded on the extending end thereof in intermeshing relation with the teeth of the rack bar for sliding the same forwardly in the track way in opposition to the urgement of the spring 39. The gear 60 is disposed in threaded engagement with the shaft so that the motor will be energized but a drive connection will not be established to the rack bar until a lapse of time sufficient for the operation of the shutters and camera mechanism to be described. A shaft 62 is journaled in a horizontal position on the bottom plate by means of U-shaped bearing brackets 64. A gear 66 is carried by one end of the shaft and disposed in meshing relation with the rack bar, so that movement of the rack bar through the drive shaft carried by the motor will impart rotation to the shaft 62. In the latter respect, it is to be noted that the gear 66 is freely disposed on the end of the shaft and the rotation of the gear is imparted to the shaft by means of a ratchet 70 fixed on the shaft adjacent the inner surface of the gear and a dog pivotally carried by the gear 66 and disposed in engagement with the ratchet. It can be appreciated that the particular type of intermittent drive is necessary in order to insure that the film is carried from the unwinding spool to the take-up spool, since a reversal of the winding order would result in a double exposure of the film already exposed. A pair of complementary gears 74 and 76 are journaled on the central portion of the shaft in engagement with the opposing longitudinally extending marginal perforations in the film. A similar shaft 78 is rotatably journaled by means of bearings 80 and disposed parallel with the shaft 62, film engaging gears 82 being disposed on the shaft. A chain 84 is trained around pulley gears carried by the extending ends of the shafts for drivingly connecting the shaft 78 with the shaft 62.

The film engaging and driving gears carried by the two shafts are enclosed within a rectangular housing 88, having the upper end thereof open and the upper edges of the walls being covered with resilient or protective material 90. A film aligning and dividing member 92 is formed with a transverse centrally disposed divider bar 94, so that the film positioned in alignment with the lens action is divided into two adjoining spaces, each of the spaces being vertically aligned with one of the lenses, as will be later described. The member 92 is mounted above the film driving gear by means of U-shaped end brackets 96 and 98, which have their laterally disposed ends mounted on the bottom wall.

A baffle 100 is disposed transversely in the casing and is formed with a horizontally positioned central portion 102. The baffle forms a light-tight compartment in the base, within which the foregoing mechanism is mounted. A standard and conventional lens 104 is mounted in the horizontal portion 102 of the baffle and a lens 106 is disposed adjacent thereto. The lens 106 is of a standard construction and adapted for distant focusing. The lens 104 is conventionally constructed and is adapted for photographing fingerprints so that the fingerprints can be read. Both of the lenses are connected by a shutter operating bar 108 secured to the shutter bars 110 and 112 projecting laterally from the lenses. The shutter bar 108 is provided to simultaneously operate the shutters and is actuated by a solenoid 160. A plurality of telescopically arranged tubes 114 are associated with the lens 106 and extend upwardly therefrom. An inner tube 116 terminates in an angularly disposed magnifying lens 118 protruding outwardly of the casing. Of course, the tubes have disposed therein the necessary prisms and reflecting surfaces conventionally placed and formed to transmit an image to the lens and film. Thus, by means of the lens 118 and tubes 114 and the lens 106 the image of an individual can be focused on the film. Of course, suitable locking means will be provided for maintaining the tubes in the desired raised positions for focusing on a person's face, depending upon the height of the person. A pair of diagonally disposed transparent plates 120 and 122 are secured to the back wall of the casing and disposed in alignment with a slot 124 formed longitudinally in the top wall of the rear section 18. Written matter, such as a check or the like 126 can be dropped into the slot and inserted between the plates, with the written side superimposed on the plate 120, so that the written matter is within the focal range of the lens 104. A microswitch 121 is located at the inner ends of the plates and is located in the circuit 171 so that the motor and solenoid can be simultaneously energized but the two will operate separately and sequentially in order to prevent any exposure of the film as it is being moved.

A plurality of finger openings 128 are disposed transversely in the front section 20, the finger openings being in alignment with finger accommodating tubes 130 protruding interiorly of the casing. Each of the tubes is provided with a rectangular cut-out portion 132 through which the fingers of the individual can be focused on the lens 104 and imposed on the film.

Of course, a bulb 134 is carried by the inner wall of the front section for illuminating the interior of the casing and illuminating the written matter 126 and the fingers of an individual disposed through the slots 132.

Figure 7:
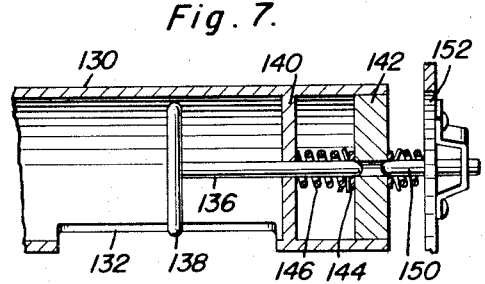
Figure 7 is an enlarged detail view of one of the circuit switches disposed in each of the finger slots.
Figure 8:
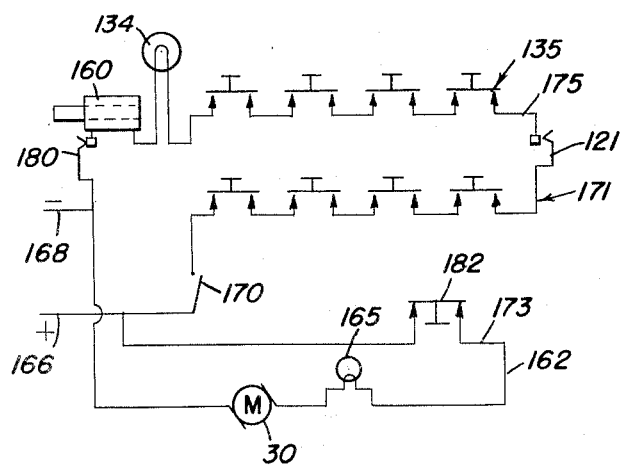
Figure 8 is a diagrammatic wiring view.
Figure 2:
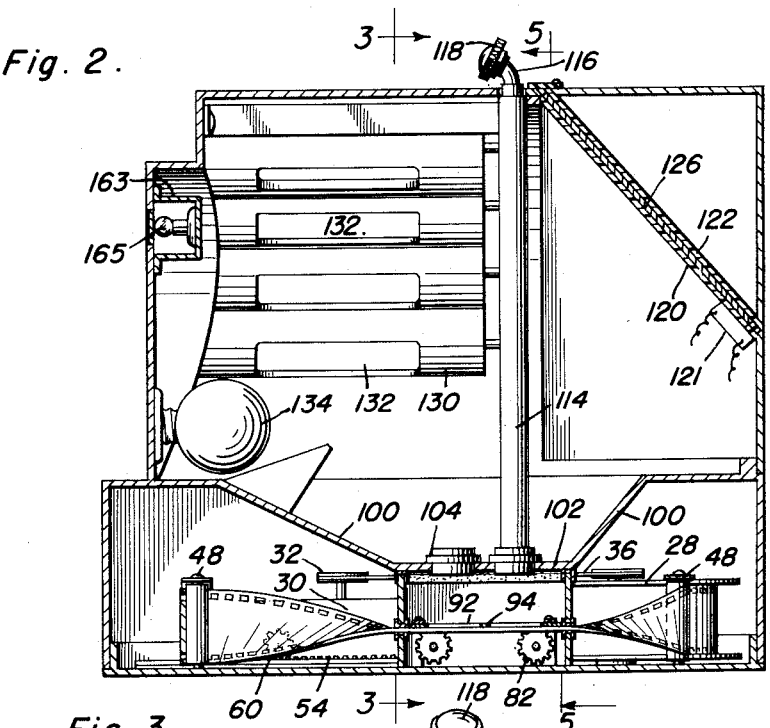
Figure 2 is a vertical sectional view taken on a transverse plan line 2—2 of Figure 1.
Figure 3:
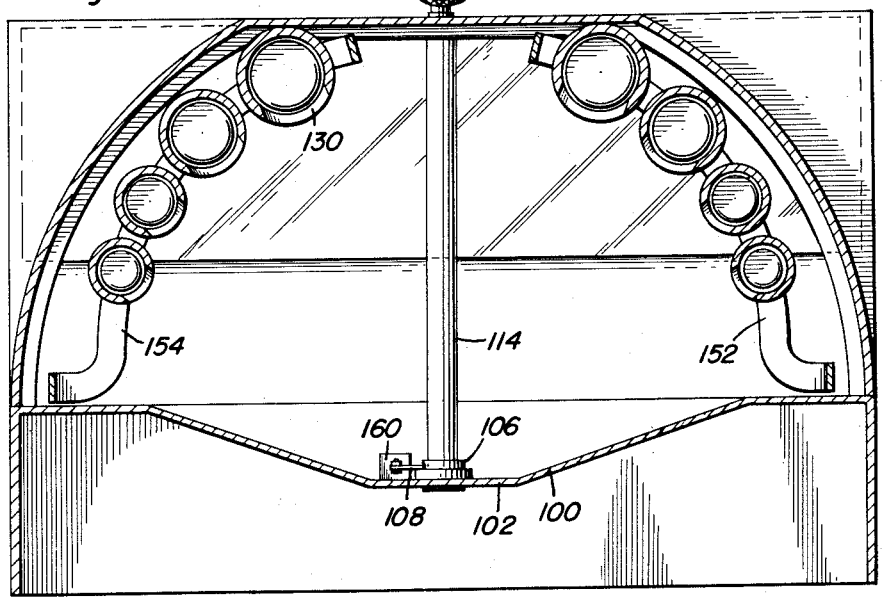
Figure 3 is a longitudinal vertical sectional view taken on line 3—3 of Figure 2.
Figure 9:
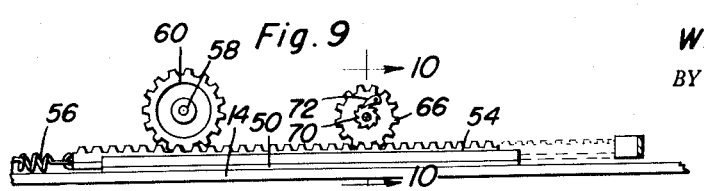
Figure 9 is an enlarged detail view taken on line 9—9 of Figure 4.
Figure 4:
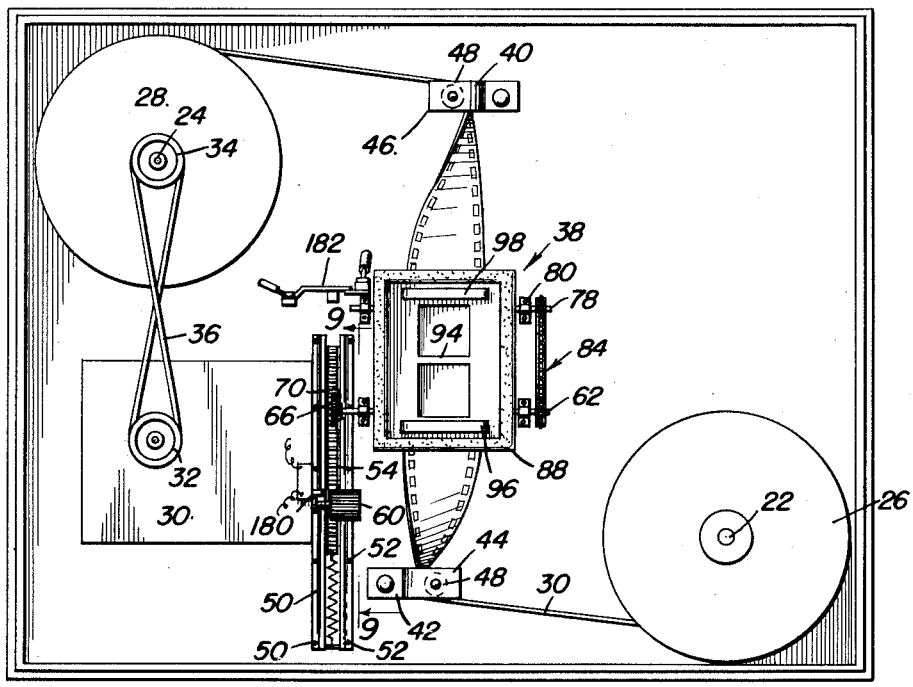
Figure 4 is a bottom plan view, with the base plate removed.
Figures 5, 10:
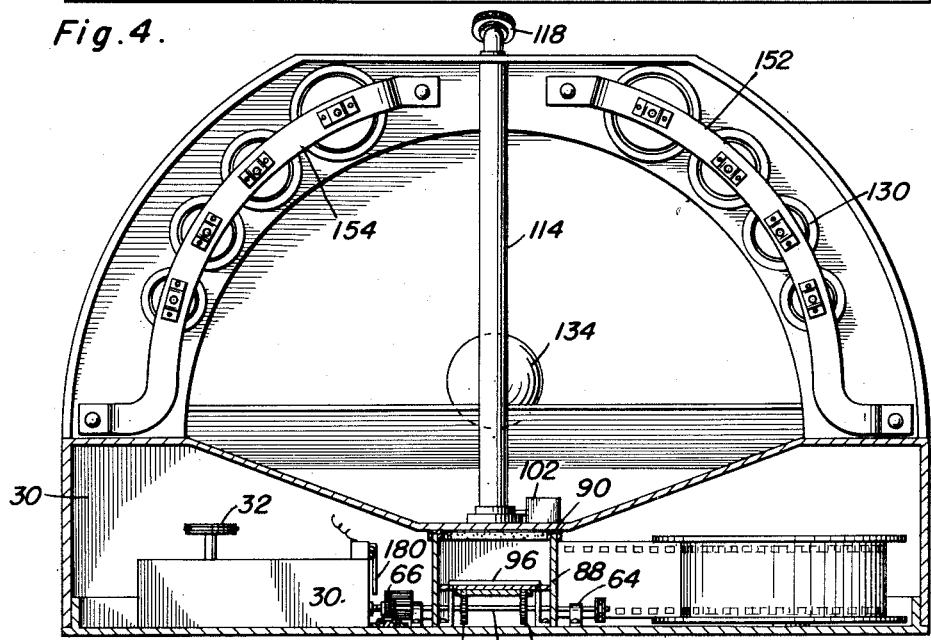
Figure 5 is a longitudinal sectional view taken on line 5—5 of Figure 2.
Figure 10 is a transverse sectional view taken on line 10—10 of Figure 9.

Attention is now directed to Figure 7, wherein it is to be noted that a plunger 136 is slidably disposed in the inner end of each tube 130. The plunger is formed with an enlarged head 138 against which the fingertips of the individual engage to force the plunger inwardly of the casing. The tubes 130 are formed with spaced transverse partitions 140 and 142 having longitudinally aligned central openings, within which the plunger 136 is adapted to slide. A stop plate 144 is formed adjacent the inner end of the plunger and a spring 146 is concentrically disposed about the plunger for urging the same outwardly into an inoperative position, as seen in Figure 7. The plunger 136 constitutes a movable contact member which is adapted to engage a fixed contact member 150 having its end inserted in the opening formed in the partition or end wall 142.

The contact members 150 are carried in spaced group formation by a pair of arcuate bars 152 and 154 secured to the inner surface of the front wall of the casing.

Attention is now directed to the diagram of the wiring circuit for the shutter actuator for simultaneously operating the two lenses and for the motor and film threading and winding mechanism actuated thereby.

It is to be noted that the solenoid 160 and the motor 30 are disposed in separate circuits, which are wired together. The circuit 171 includes a motor circuit 173 and circuit 175 for the solenoid. It is to be noted that the finger switches 135 and the microswitch 121, disposed at the inner edges of the plates 120 and 122 control the operation of the device, after the hand switch 170 is closed. As before stated, when the finger switches 135 and the check switch are closed, the circuit is complete and the solenoid is energized, whereby the shutter bar is actuated and the film is exposed, the latter receiving the images of the check, the fingers, and the face of an individual. During the operation of the shutter bar and camera mechanism, the motor is energized so that the drive shaft is rotating, the gear 60 moving inwardly to a binding position. The slip clutch arrangement provided enables the motor to be wired in the same circuit with the solenoid, whereby the dropping of the check in the slot and the insertion of fingers in the openings actuates all of the mechanisms. As the gear 60 approaches the motor 30, the film has been exposed, so that the gear abuts against a switch 180 and the solenoid circuit is shunted out from the power source 166. The motor then functions, through the gear 60 to move the rack bar upwardly, against the urgement of the spring. The sliding movement of the rack bar is translated into a sliding movement of the film, through the gears and shafts. When the rack bar approaches the terminating point of its movement, it moves against a switch 182, so that the switch is opened and the circuit for the motor is cut out. Thus, it can be seen that when the shutter mechanism is operating, the motor, though energized and working, is not drivingly associated with the film threading mechanism, until the gear 60 is moved inwardly relative to the motor. At that time, the gear abuts against the switch and shunts out the circuit for the solenoid. Double exposure or over exposure of the film is thereby avoided and yet, the same circuit can be employed for all of the moving mechanisms and can be controlled, through the finger and check switches. This will enable the device to be automatically operated by the user and will avoid the necessity of having an operator constantly supervising the working of the device. Of course, a lamp 134 is wired in the solenoid circuit, the lamp being disposed above the baffle and located adjacent to the finger tubes. A lamp 165 is wired in the motor circuit, so that the bulb, which is disposed in a housing 163 disposed at the front of the casing will enable observers to know that the device is in operation.

Thus, it can be seen that this device can be employed for many varied purposes, it being primarily intended for use in a bank. In such use, it is thought that the device could be positioned on the shelf of a teller's cage and the teller would initially throw the manual switch 170. Thereafter, customers coming to the teller's cage with checks, would drop the checks in the slot and would position their fingers in the finger tubes. Such actions would close the respective switches and the solenoid would be energized, whereby the pictures would be taken. Then, the person would remove their fingers from the slots, breaking the circuit for the solenoid. If the individual momentarily forgot to remove his fingers, the solenoid circuit still would be broken by the switch 180, which is actuated by the sliding gear. The motor, through the slip clutch drive arrangement, would move the film, moving the exposed section of sensitized film out of alignment with the lens action and placing a new section therein.

It can be appreciated, therefore, that a novel and useful device has been provided that will simultaneously record facial characteristics of a person and other data or objects.

However, while one embodiment of this invention has been shown, it is to be understood that certain other embodiments can be carried out, as coming within the spirit and scope of the appended claims.

Having described the invention, what is claimed as new is:

1. In a photographic apparatus, a casing, a lens disposed in said casing, a second lens disposed adjacent said first lens, extensible means mounted in the casing above said second lens for receiving images disposed exteriorly of the casing and reflecting them on to the second lens, shutters for said lenses, means for simultaneously actuating said shutters, a plurality of tubes disposed in said casing for receiving the fingers of an individual and having cut-out portions to expose the tips of fingers inserted therein, switches disposed in said tubes and adapted to be closed by the fingertips of an individual, said switches being adapted to control an operating circuit for said means for actuating the shutters.

2. In a photographic apparatus, a casing, a lens disposed in said casing, a second lens disposed adjacent said first lens, means mounted above said second lens and disposed exteriorly of the casing for reflecting images onto the lens, shutters for said lenses, a solenoid for simultaneously actuating the shutters, a plurality of tubes disposed in the casing and positioned within the focal range of the second lens for receiving the fingers of an individual, and having cut-out portions to expose the tips of fingers inserted therein means in said tubes for controlling said solenoid, said means being operated by the fingertips of an individual.

3. In a photographic apparatus, a casing, a lens disposed in said casing, a second lens disposed adjacent said first lens, a periscope mounted above said second lens and projecting exteriorly of the casing, shutters for said lenses mounted in the casing, means for simultaneously actuating said shutters, a film trackway in said casing and positioned below said lenses, means for sequentially moving film through said trackway, a plurality of horizontally disposed finger tubes in said casing overlying said first lens and having cut-out portions formed in their inner ends to expose the tips of fingers inserted therein, a transparent housing mounted in said casing and positioned within the focal range of the first lens, a circuit connected to a source of electrical energy, switch means operatively mounted in said tubes for controlling said circuit, said shutter actuating means and simultaneously said film moving means being connected to said circuit and operated through control of the circuit.

4. The combination of claim 3, wherein said film moving means includes a prime mover, drive transmitting means connected thereto and including a sliding rack bar and complementary gear driven by the prime mover, a slip clutch arrangement between said gear and prime mover, a switch actuated by said gear for shunting said shutter actuating means out of the circuit and a switch actuated by the rack bar for breaking said circuit.

5. The combination of claim 3, wherein said switch means in the tubes includes fixed contacts and movable contacts operated by the finger tips of an individual placed within the tubes, means for breaking the engagement of the contacts upon release of the finger pressure.

6. In a photographic apparatus, a casing, a first lens mounted in said casing, a second lens mounted in said casing adjacent to said first lens, means mounted above the second lens and projecting exteriorly of the casing for reflecting exterior images onto the lens, shutters for said lenses, means for simultaneously actuating said shutters, a plurality of horizontally disposed finger tubes in said casing overlying the first lens and having openings formed adjacent their inner ends to expose the tips of inserted fingers to the first lens, a transparent housing in said casing and positioned within the focal range of the first lens, and means in said tubes for controlling the actuating means for the shutters.

7. In a photographic apparatus, a casing, a first lens mounted in said casing, a second lens mounted in said casing adjacent to said first lens, means mounted above the second lens and projecting exteriorly of the casing for reflecting exterior images onto the lens, shutters for said lenses, means for simultaneously actuating said shutters, a plurality of horizontally disposed finger tubes in said casing overlying the first lens and having cut-out portions to expose the finger tips of an individual to the lens, a transparent housing in said casing and positioned within the focal range of the first lens, and means mounted in said tubes for controlling the actuating means for the shutters, said means being reactive to pressure of fingers placed in the tubes.

8. In a photographic apparatus, a casing, a first lens mounted in said casing, a second lens mounted in said casing adjacent to said first lens, means mounted above the second lens and projecting exteriorly of the casing for reflecting exterior images onto the lens, shutters for said lenses, means for simultaneously actuating said shutters, a plurality of horizontally disposed finger tubes in said casing overlying the first lens and having cut-out portions for exposing the tips of fingers inserted in the tubes, a transparent housing in said casing and positioned within the focal range of the first lens, means for moving film below said lenses and means for controlling the actuating means for the shutters and the film moving means, said last means being mounted in the tubes and operable, upon the positioning of fingers of an individual in the tubes.

9. In a photographic apparatus, a casing, a pair of lenses mounted in the casing, shutters for said lenses, a solenoid simultaneously actuating said shutters, means mounted below the lenses and operable for moving unexposed frames of film into position below the lenses for exposure, a plurality of finger tubes in said casing overlying one of the lenses and having cut-out portions to expose the finger tips of an individual and means in said tubes operable upon the positioning of fingers of an individual in the tubes for controlling said solenoid and film moving means.

10. In a photographic apparatus, a casing, a pair of lenses mounted in the casing, shutters for said lenses, a solenoid simultaneously actuating said shutters, means mounted below the lenses and operable for moving unexposed frames of film into position below the lenses for exposure, a plurality of finger tubes in said casing overlying one of the lenses and having openings formed in the lower portions thereof adjacent their inner ends to expose the tips of fingers inserted therein and means in said tubes operable upon the positioning of fingers of an individual in the tubes for controlling said solenoid and film moving means, said film moving means being operable in sequence to the solenoid and means controlling said sequential operation.

11. In a photographic apparatus, a casing, a pair of lenses mounted in the casing, shutters for said lenses, a solenoid simultaneously actuating said shutters, means mounted below the lenses and operable for moving unexposed frames of film into position below the lenses for exposure, a plurality of finger tubes in said casing overlying one of the lenses and having cut-out portions to expose the finger tips of an individual, an operating circuit for said solenoid and film moving means connected to a source of electrical energy, switch means for said circuit mounted in the tubes and operable reactive to finger pressure to control said circuit.

12. The combination of claim 11, wherein said switch means are arranged in series.

13. In a photographic apparatus, a casing, a pair of lenses mounted in the casing, shutters for said lenses, a solenoid simultaneously actuating said shutters, means mounted below the lenses and operable for moving unexposed frames of film into position below the lenses for exposure, a plurality of finger tubes in said casing overlying one of the lenses and having cut-out portions to expose the inserted finger tips of an individual within the focal range of one of the lenses, an operating circuit for said solenoid and film moving means connected to a source of electrical energy, and switch means for said circuit in said finger tubes.

14. In a photographic apparatus, a casing, a pair of lenses mounted in the casing, shutters for said lenses, a solenoid simultaneously actuating said shutters, means mounted below the lenses and operable for moving unexposed frames of film into position below the lenses for exposure, a plurality of finger tubes in said casing overlying one of the lenses and having cut-out portions to expose the inserted finger tips of an individual within the focal range of one of the lenses, a transparent housing in said casing disposed within the focal range of one of the lenses, an operating circuit for said solenoid and film moving means connected to a source of electrical energy and switch means in said tubes and housing and connected in series in the circuit, said switches being operable to control the circuit.

WILLIAM T. CIRONE.

REFERENCES CITED

The following references are of record in the file of this patent:

UNITED STATES PATENTS

| Number | Name | Date |
|---|---|---|
| 825,241 | Pino | July 3, 1906 |
| 1,511,042 | Satterlee | Oct. 7, 1924 |
| 1,645,590 | Ernst | Oct. 18, 1927 |
| 1,733,783 | Medina | Oct. 29, 1929 |
| 1,963,417 | Petit et al. | June 19, 1934 |
| 1,973,665 | Shannon et al. | Sept. 11, 1934 |
| 2,026,500 | Hutchings | Dec. 31, 1935 |
| 2,125,388 | Monroe | Aug. 2, 1938 |
| 2,161,355 | Jacobson | June 6, 1939 |
| 2,195,699 | Johnson | Apr. 2, 1940 |
| 2,339,657 | Smith | Jan. 18, 1944 |
| 2,347,749 | Monroe | May 2, 1944 |
| 2,394,225 | Ashford | Feb. 5, 1946 |
| 2,420,046 | Loeb | May 6, 1947 |